United States Patent

[11] 3,542,343

| [72] | Inventor | Carl R. Stoelting<br>Kiel, Wisconsin |
|---|---|---|
| [21] | Appl. No. | 802,844 |
| [22] | Filed | Feb. 27, 1969 |
| [45] | Patented | Nov. 24, 1970 |
| [73] | Assignee | Stoelting Brothers Company<br>Kiel, Wisconsin<br>a corporation of Wisconsin |

[54] SHAKE MIXER
8 Claims, 8 Drawing Figs.

[52] U.S. Cl. ............................................ 259/22
[51] Int. Cl. ............................................. B01f 7/00
[50] Field of Search ............................ 259/40, 41, 42, 43, 19, 21, 22, 23, 24, 5, 6, 7, 8, Drink Mixers, Drink Mixer Motor, 102, 103, 106, 107, 108, 44

[56] References Cited
UNITED STATES PATENTS

| 2,358,679 | 9/1944 | Zacher | 259/6 |
|---|---|---|---|
| 2,564,852 | 8/1951 | Mason | 259/24 |
| 2,793,838 | 5/1957 | Painter | 259/23 |
| 3,224,740 | 12/1965 | Kuehn | 259/8 |
| 3,276,633 | 10/1966 | Rahauser | 259/8 |

Primary Examiner—Robert W. Jenkins
Attorneys—John W. Michael, Gerrit D. Foster, Bayard H. Michael, Paul R. Puerner, Joseph A. Gemignani, Andrew O. Riteris and Spencer B. Michael ABSTRACT: The mixer has spaced impellers which rapidly mix suitable flavors into a soft serve product dispensed into the cup. In order to position the cup the operators forearm will raise the splash guard and this will close a switch starting the mixer/impeller and starting the refrigeration compressor (bypassing the refrigeration system thermostat). Upon removal of the cup the splash guard drops to block spray from the impeller. Mixing is extremely vigorous and fast.

Patented Nov. 24, 1970
3,542,343
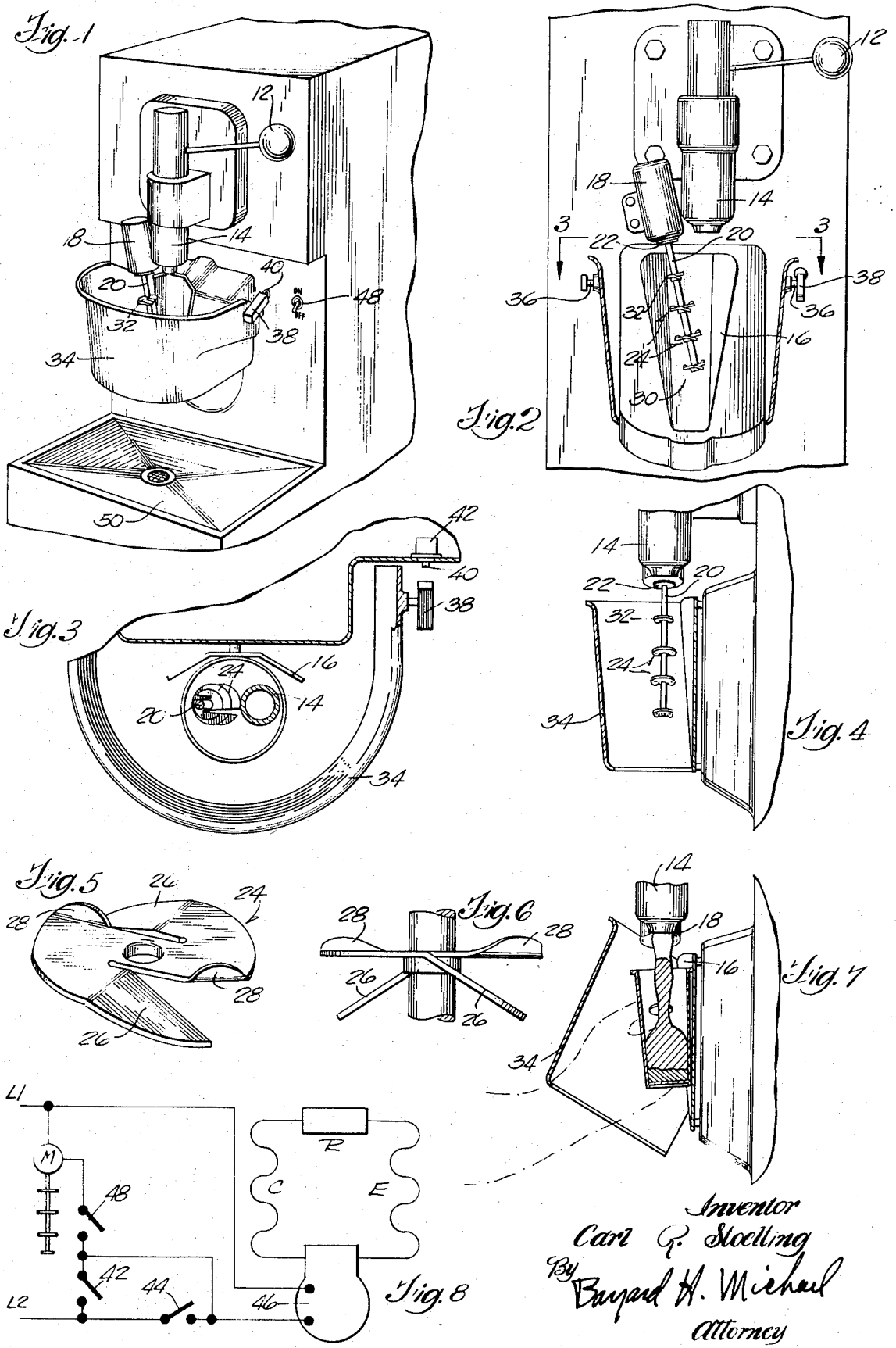

SHAKE MIXER

BACKGROUND OF INVENTION

This invention relates generally to the field of malted milks or milk shakes. These beverages have traditionally been made by a combination of ice cream, milk, and flavor blended in a conventional mixer upon order. Public preference is changing over to a heavier milk shake and the merchandiser is now confronted with essentially two choices: (1) to sell the product light enough to be able to mix in the conventional mixing equipment; or (2) to flavor a mix and freeze it in a soft serve type of equipment. This equipment is generally the same as employed in vending the usual soft serve ice cream or ice milk but is usually modified for this purpose to produce a slightly thinner product. Going back to the two choices confronting the merchandiser, the first frequently leaves the merchandiser with a product too thin for public taste and the second limits the merchandiser to producing only one flavor. Some soft serve machines have undertaken to equip the machine with a spinner or mixer adjacent the discharge spout in an effort to blend in the desired flavor at the time of dispensing the soft serve product into the cup or container. Here, again, serious problems are found in that the spinners are not capable of handling a heavy product with the requisite speed.

SUMMARY OF INVENTION

The mixer shaft is positioned at one side of the dispenser spout and tilted to intersect the spout axis at about the level of the bottom of a cup to be filled. The shaft carries spaced impellers each having downwardly bent ears which drive the soft serve downwardly vigorously—with such power that even thick chocolate syrup can be rapidly mixed into the product virtually as fast as the soft serve can be fed into the container. The ears on each impeller disc should be bent equally—if unequal the mixing is much slower.

Splash or spray is contained by a splash guard pivoted on the front of the machine to be raised by the operator's arm while placing a cup in position. Raising the guard closes a switch to start the mixer/impeller and the refrigeration compressor. This anticipates the need for cooling rather than waiting for the thermostat to sense the actual need. The automatic switch operated by the guard will always start the compressor but is connected to the mixer motor through a manual on-off switch which can disable the motor should it be desired to dispense a sundae, for example.

DESCRIPTION OF DRAWINGS

FIG. 1 is a fragmentary perspective view of a shake machine showing the dispensing valve and the mixer positioned adjacent thereto with a splash guard mounted to prevent the operator from receiving spray from the mixer spindle upon removal of the cup after the mixing operation.

FIG. 2 is a front view of the machine and passes partly through the spray guard so as to show the mixer and dispensing head with the guide plate positioned immediately behind the mixer spindle.

FIG. 3 is a top view taken generally along the line 3-3 in FIG. 2.

FIG. 4 is a side vertical view partly in section.

FIG. 5 is a perspective view of one of the impeller discs, this one being one of the two central discs.

FIG. 6 is a side view of one of the discs shown in FIG. 5.

FIG. 7 is a vertical section generally showing the operating concept with the splash guard tilted while the cup is positioned to receive soft serve.

FIG. 8 is a generally schematic wiring diagram showing the manner in which both the refrigeration compressor and the mixer motor are regulated.

DESCRIPTION OF PREFERRED EMBODIMENT

The usual freezer chamber with the auger, etc. is mounted in cabinet 10 and the soft serve comes out of the front wall through a valve controlled by handle 12 to be dispensed from the downwardly projecting spout 14 into a cup positioned underneath the spout. Placement of the cup is facilitated by a winged guide 16. Mixer motor 18 is positioned to one side of the dispensing spout with spindle 20 projecting downwardly at an angle to intersect the projection of the dispensing spout axis. The spindle is frictionally retained within the motor for driving connection by a keyway or the like and has an upper deflector plate 22 for preventing the mix from splashing up into the motor along the spindle shaft. Four impellers are vertically spaced along the length of the spindle. The principal impellers are the middle two impellers which are larger than the top and bottom impellers. The configuration of the impellers has been found to be rather critical and in FIGS. 5 and 6 the details of the construction can be readily seen. Thus it can be seen that the impeller disc 24 is slotted along a line perpendicular to the diameter so as to provide parallel oppositely projecting slots. This forms two large ears 26, 26 which are bent downwardly generally along the diameter of the disc. They are bent downwardly at substantially equal angles, the most efficient angle having been found to be 32½°. The leading corners of the trailing, flat portion thus formed are now bent upwardly along a crease line at about 45° to the line of the slot, this forming upwardly and outwardly projecting, small ears 28 which, by reason of their angulation to the direction of rotation, tend to scoop the mix and force it downwardly and also outwardly while the large ears principally force the mix downwardly. The mixing action thus obtained is extremely vigorous and efficient. The lower impeller disc 30 is generally similar to the middle discs but the large ears are not bent down as much since this disc will be quite close to the bottom of the cup and the downward action should not be too great here since with a small amount of fill or mix in the cup this could generate quite an upward movement as a result and considerable splashing could occur. The top impeller 30, 32 has the large ears bent down about the 32½° angle but does not have the small ears projecting upwardly since these could then tend to churn the surface too close to the top of the cup and again create splashing problems.

Where a flavored milk shake is desired, the flavor itself is first placed in the cup and with this impeller arrangement a thick, heavy shake can be dispensed into a cup as rapidly as the machine can deliver the mix and the flavor will be thoroughly mixed into the shake as fast as the shake can be dispensed. There is no other known machine capable of mixing such a heavy shake in so short a time. A 20-ounce shake can be completely mixed and ready for the customer in 15 seconds or less.

When the cup is to be placed into position the operator must reach under the splash guard 34 mounted on the pivots 36, 36. As the cup is raised into position the splash guard must be raised and, as it comes up, block 38 positioned on the right side of the splash guard will move forward against the plunger 40 of the switch 42 to close the switch. As can be seen in FIG. 8, switch 42 is connected to shunt the thermostatic switch 44 and place the compressor motor 46 across lines $L_1$ and $L_2$ when switch 42 is closed. Thus whenever the splash guard is raised, the compressor motor will be placed into operation in anticipation of the need for more refrigeration as product is withdrawn from the machine. It will be noted that a manual toggle switch 48 is positioned on the front wall of the machine. If this switch is placed in the "on" position (closed) actuation of the automatic switch 42 by the splash guard will now act to place the mixer motor M across the line as well as starting the refrigeration compressor. Therefore, there is no need for the operator to do anything other than position the cup. It should be noted that an exact positioning of the cup is not required in order to start the mixer motor. It will be appreciated that if the toggle switch 48 is opened (moved to the "off") the mixer will not start when the splash guard is raised. This permits soft serve product to be dispensed without the mixing action as would be desirable when making a sundae or the like. To complete the description of FIG. 8, the refrigeration compressor discharges refrigerant into condenser C, then to the receiver R, and then to the evaporator E (there being some form of a thermostatic expansion valve or restrictor between the receiver and the evaporator).

When the cup is withdrawn from the machine, the splash guard is lowered as the operator's hand is withdrawn. This will open switch 42 and shut down the mixer motor (and also the compressor) but there is always some override and the tendency to throw off spray from the spindle is of no consequence since this will merely impinge on the interior of the splash guard and subsequently drain down to the drain tray 50.

It will be noted that the various impellers along the length of the mixer spindle 20 permit use of various sizes of containers to mix the various sizes of shakes customarily dispensed. The mixing action is excellent for any of the various sizes.

I claim:

1. A milk shake machine having a valve for dispensing soft serve product into a cup positioned therebelow:
    a mixer including a spindle positioned to one side of the valve and angled towards the dispensing axis;
    a plurality of impellers spaced along the spindle; and
    the impellers having downwardly projecting tabs which force mix downwardly.

2. A shake machine according to claim 1 in which the tabs on each impeller are bent downwardly at substantially the same angle.

3. A shake machine according to claim 2 in which the tabs are bent downwardly about the diameter of the impeller.

4. A shake machine according to claim 3 in which some of the impellers also have tabs bent upwardly and outwardly to force mix downwardly and outwardly.

5. A milk shake machine including a refrigerated chamber in which soft serve product is made:
    a dispensing valve for discharging product from the chamber;
    a mixer adjacent the valve and positioned to project into a cup positioned to receive product from the valve;
    a switch for controlling operation of the refrigeration compressor; and
    means responsive to placement of a receptacle to receive product and be mixed to close the switch.

6. A shake machine according to claim 5 in which the mixer motor is also controlled by said switch.

7. A shake machine according to claim 6 in which the mixer has a spindle with mixing impellers spaced therealong so the mixing capacity increases as the depth of product in the receptacle increases.

8. A shake machine according to claim 6 in which the means responsive to placement of the cup in position is a splash guard pivoted on the machine and actuating said switch.